United States Patent
Yoder et al.

[15] 3,698,488
[45] Oct. 17, 1972

[54] FIELD CONDITIONER

[72] Inventors: Alfred Dean Yoder, East Moline; Robert Richard Roth, Rock Island, both of Ill.

[73] Assignee: Deere & Company, Moline, Ill.

[22] Filed: Sept. 3, 1970

[21] Appl. No.: 69,365

[52] U.S. Cl. .................. 172/311, 172/456, 172/619
[51] Int. Cl. ...................... A01b 49/00, A01b 63/00
[58] Field of Search...... 172/456, 311, 452, 619, 488, 172/491; 280/411

[56] References Cited

UNITED STATES PATENTS

| | | | |
|---|---|---|---|
| 3,498,387 | 3/1970 | Roth | 172/311 X |
| 1,878,346 | 9/1932 | Swanson | 280/411 |
| 3,520,373 | 7/1970 | Stinemetz | 172/456 X |

Primary Examiner—Robert E. Pulfrey
Assistant Examiner—Stephen C. Pellegrino
Attorney—H. Vincent Harsha, Harold M. Knoth, William A. Murray, John M. Nolan and Raymond L. Hollister

[57] ABSTRACT

A flexible agricultural implement having a center section pivoted to an elongated draft frame for movement about a transverse axis between alternate lowered working and raised transport positions, a pair of outrigger sections pivotally connected to the ends of the center section for vertical swinging movement when the center section is in the lower working position and forward folding movement when the main frame is in the transport position, and brace means interconnecting each of the outrigger frame sections with the draft frame, each brace means including a pair of pole sections interconnected for limited telescopic movement.

7 Claims, 3 Drawing Figures

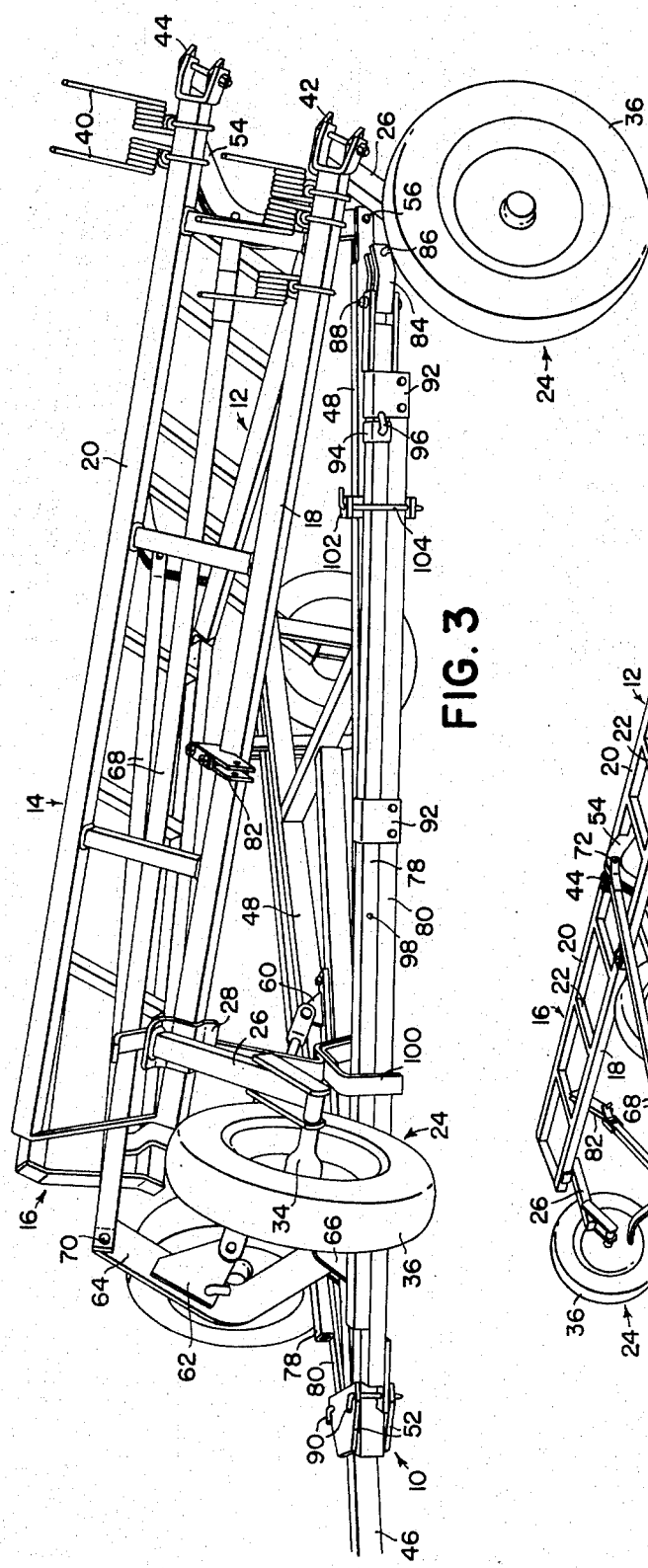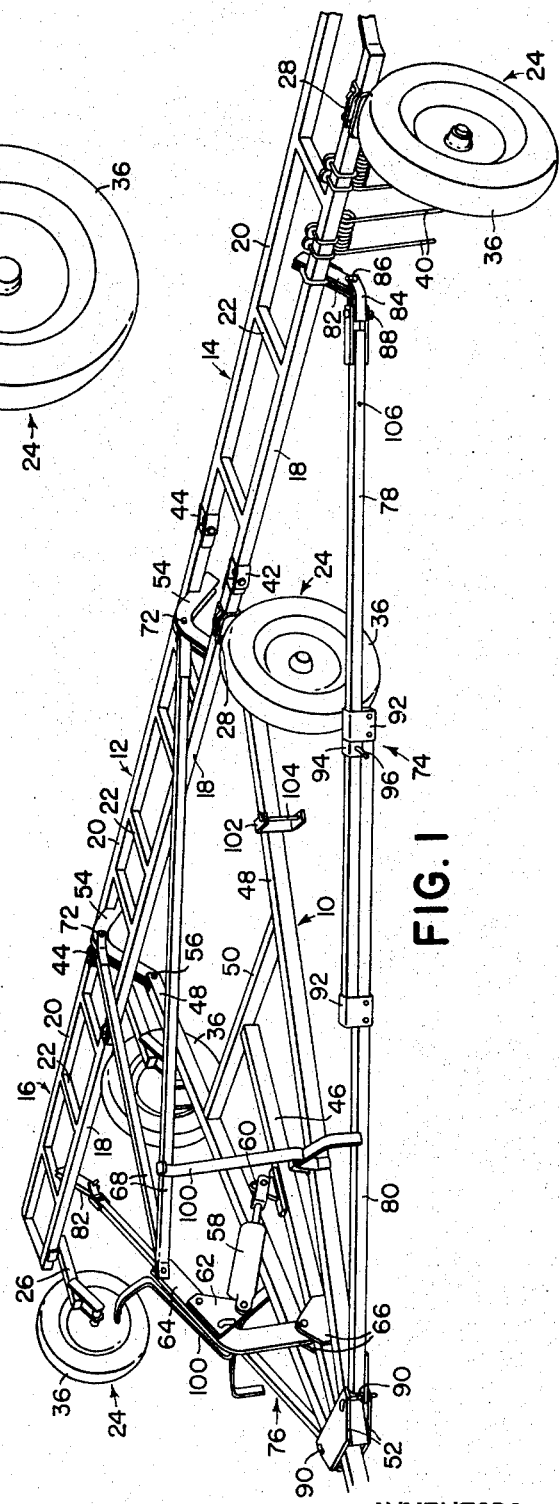

FIELD CONDITIONER

BACKGROUND OF THE INVENTION

The present invention relates generally to agricultural implements, and more particularly to flexible tillage implements.

It is necessary to construct wide tillage implements from a plurality of transversely aligned frame sections pivotally connected together. This permits the implement to conform to the ground contour and also permits the implement to be folded to a relatively narrow road transport position. An example of such an implement is illustrated in U.S. Pat. No. 3,498,387 which issued to R. R. Roth on Mar. 3 1970. The implement illustrated in this patent includes a transversely elongated frame consisting of a center section and a pair of outrigger sections pivoted to the ends of the center section. The frame is pivoted to a forwardly extending draft frame for pivotal movement about a transverse axis from a lowered generally horizontal working position to a raised transport position. Brace means extend between the draft frame and the outrigger sections to relieve stresses in the hinges interconnecting the outrigger sections with the main section when the implement is in the lowered working position and also to maintain the outrigger sections in their extended position when the implement is raised. To transport the implement, the braces are removed and the outrigger section folded forwardly along the draft frame. Implements of this type have become quite popular for conditioning fields prior to planting.

The type of implement illustrated in the above noted U.S. patent has certain disadvantages in that the braces will bend under certain operating conditions. For example, if the implement is moved through a drainage ditch or the like so that the wheels on the outrigger sections move on higher ground than the wheels on the center section, the outer ends of the outrigger sections will move upwardly relative to the center section. If the implement is partially raised when in this condition, the outer ends of the outrigger sections will move forwardly relative to the center section as they move upwardly. This forward movement of the outrigger sections is resisted by the braces and often results in the braces bending.

SUMMARY OF THE INVENTION

It has been found that the foregoing disadvantages can be overcome by using telescopic braces between the outrigger sections of the draft frame.

It is the principal object of the present invention to provide an implement carrier having an implement supporting frame pivotally connected to a draft frame for movement about a transverse axis, the implement frame including a center section and a pair of outrigger sections pivotally secured to the center section and wherein telescopic braces interconnect the outrigger sections with the draft frame.

Another object of the present invention is to provide an implement carrier of the type having an implement supporting frame pivotally connected to a draft frame for movement about a transverse axis, the implement supporting frame including a center section and a pair of outrigger sections pivotally connected to the center section, telescopic brace members interconnecting the outrigger sections with the draft frame, and stop means on the brace members to normally limit the telescopic movement of the brace members.

The above and additional objects and advantages of the present invention will become apparent to those skilled in the art after a reading of the following detailed description when taken in conjunction with the accompanying drawings.

BRIEF DESCRIPTION OF THE DRAWINGS

In the drawings:

FIG. 1 is a perspective view showing the implement carrier of the present invention in a lowered working position;

FIG. 3 is a perspective view of the implement in its raised and folded road transport position.

DESCRIPTION OF THE PREFERRED EMBODIMENT

Figure 2:
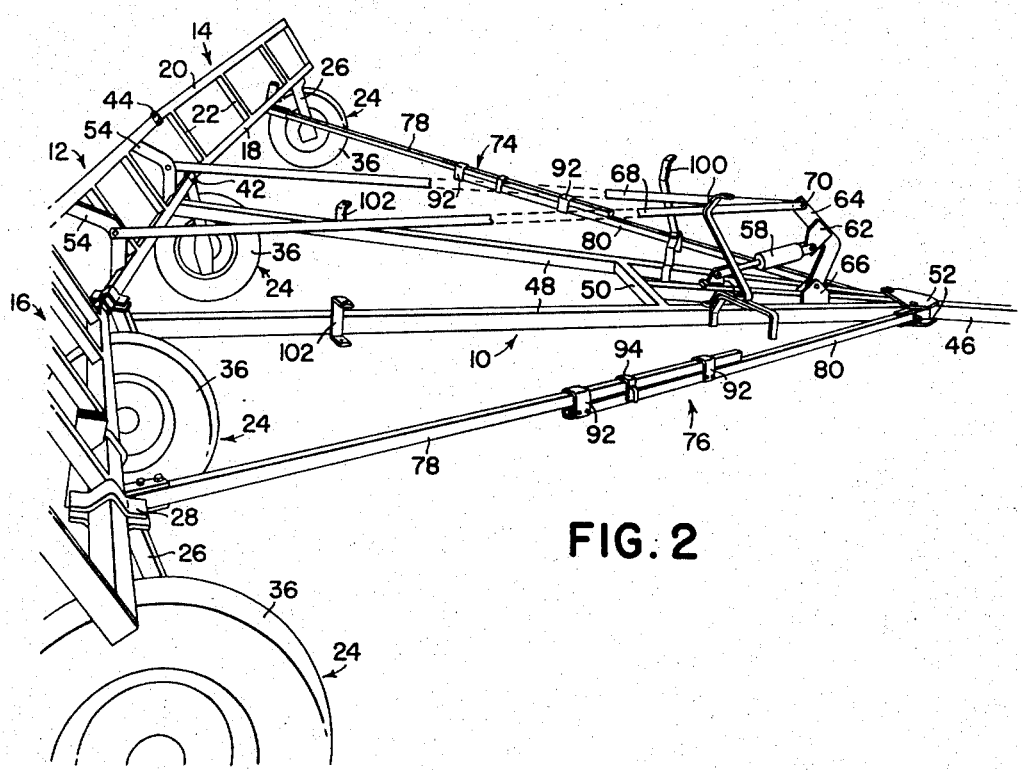
FIG. 2 is a perspective view of the implement in a raised field transport position.

Referring now to the drawings, the implement carrier includes a forwardly extending draft frame indicated generally at 10 and a transversely extending implement supporting frame made up of a center section 12 and a pair of outrigger sections 14 and 16. Each of the frame sections is formed with front and rear transversely extending toolbars 18 and 20 which are interconnected by longitudinally extending spacer bars 22.

The outer end of each of the frame sections is supported by depth gauging wheel means indicated generally at 24. Each wheel means includes a forwardly extending arm 26 having a clamping bracket 28 on its rear end to secure the wheel means to the forward toolbars 18 of the frame sections. The forward end of each arm 26 carries an axle 34 on which a wheel 36 is journaled for rotation.

The outrigger sections 14 and 16 are secured to the center section 12 by front and rear hinge assemblies 42 and 44. Although the axes formed by the hinge assemblies 42 and 44 extend generally fore-and-aft, they do form a small angle with the longitudinal center line of the implement carrier so as to be forwardly diverging. The fact that the axes formed by the hinge assemblies 42 and 44 are forwardly diverging forms no part of the present invention, and for a full description of their construction and operation reference can be had to the aforementioned U.S. Pat. No. 3,498,387.

The draft frame 10 includes a longitudinally extending main draft beam 46 and a pair of forwardly converging draft members 48. The forward end of the main draft beam 46 is adapted to be connected to a propelling vehicle and an intermediate portion of a transversely extending bracing member 50 is secured to its rear end. The forward ends of the draft members 48 are secured to an intermediate portion of the draft beam 46 through a pair of vertically spaced plates 52 and intermediate portions of the side members 48 are secured to the ends of the bracing member 50. A pair of inverted generally U-shaped mounting assemblies 54 are secured to the ends of the center section 12, the rear leg of each assembly 54 being secured to the rear toolbar 20 in any suitable manner, and an intermediate portion of the forward leg of each assembly 54 being secured to the forward toolbar 18 in any suitable manner. The lower forward ends of the assemblies 54 are suitably apertured and secured to the rear ends of the draft members 48 by pivot bolts 56. The pivot bolts 56 form a transverse axis about which the implement supporting frame can be moved between a lowered generally horizontal ground-working position illustrated in FIG. 1 and raised transport positions illustrated in FIGS. 2 and 3.

The implement supporting frame can be moved between its lowered working position and raised transport position by power means in the form of a double-acting extensible and retractable hydraulic cylinder 58. The cylinder 58 has one end pivotally connected to a bracket 60 on the main draft beam 46 and its other end pivotally connected to a bracket 62 on an arm 64. The lower end of the arm 64 is pivoted between a pair of brackets 66 secured to the draft beam 46 and the upper end of the arm 64 is interconnected with the bight portion of each of the mounting assemblies 54 by a pair of rigid links 68. The forward ends of the links 68 are pivotally connected to the upper end of the arm 64 by a pin 70 and the rear ends are pivotally connected to the bight portions of the mounting assemblies 54 by pivot pins 72. When the cylinder 58 is extended to force the upper end of the arm 64 forward, the implement supporting frame is moved about the transverse axis formed by the pivot bolts 56 from the lowered working position illustrated in FIG. 1 to a raised position such as that illustrated in FIG. 2 to raise tools 40 carried by the implement supporting frame out of contact with the ground. Retraction of the cylinder 58 will move the implement supporting frame back to the normal working position.

In order to relieve the stresses on the hinge assemblies 42 and 44 and to maintain the outrigger sections in the extended position, the outrigger sections 14 and 16 are interconnected with the draft frame by a pair of braces indicated generally at 74 and 76. Each of the braces includes first and second rigid pole sections 78 and 80. The first pole sections 78 are connected to brackets 82 on the outrigger sections by intermediate brackets 84. The intermediate brackets 84 are pivotally connected to the brackets 82 by removable pivot pins 86 positioned generally parallel to the toolbars 18 and 20 and are connected to the rear end of the first pole sections by pivot pins 88 positioned normal to the pivot pins 86. The forward ends of the second pole sections 80 are pivotally connected to the plates 52 by pivot pins 90. The adjoining ends of the first and second pole sections of each brace overlap and are telescopically connected together by a pair of U-shaped guide members 92. The guide members 92 are slidably positioned over the first pole sections and have their legs secured to the second pole sections. The telescopic movement of the first and second pole sections of each brace is limited by a U-shaped stop member 94 positioned on the first pole section 78 and adapted to engage the guide members 92 at the extreme ends of the movement of the first pole section 78 with respect to the second pole section. The stop member 94 is retained in position on the first pole section 78 by a removable pin 96 extending through aligned apertures in the stop member 94 and a corresponding aperture 98 in the first pole section.

During normal operation with the implement in the position illustrated in FIG. 1, the outrigger sections 14 and 16 are free to move vertically with respect to the center section 12 so as to conform to ground contour, and the stop members 94 of each brace will abut against the rear guide members 92 to transmit a portion of the draft force on the outrigger sections to the draft frame and relieve the stresses on the hinge assemblies 42 and 44. During the normal course of operation, the implement supporting frame can be raised by rotation about the transverse axis to dump trash which may have collected on the tools, to permit movement through a ditch or the like, or to facilitate turns on headlands. If, while the tool supporting frame is in the raised position, the implement carrier were to move over a surface which tended to raise the outer ends of the outrigger frame sections with respect to the center section, the relative vertical movement of the outrigger sections must be accompanied by forward movement of the outrigger sections because of the hinge lines formed by the hinge assemblies 42 and 44. This forward movement is accommodated by the limited telescopic movement of the first and second pole sections of the braces. The hinge pins 86, 88 and 90 which connect the braces 74 and 76 to the outrigger sections and draft frame accommodate the raising and lowering movement of the implement supporting frame about the transverse axis and also accommodate the telescopic movements of the brace members.

When the implement carrier is to be moved along a public road, it must be reduced in width, and for this purpose a pair of outrigger section transport supports 100 are mounted on forward portions of the draft members 48 and a pair of brace transport supports 102 are mounted on a rear portion of the draft members 48. Each of the transport supports 102 consists of a C-shaped bracket having its bight secured to the draft member 48 and its legs extending laterally toward the brace. The legs of the C-shaped support member are apertured at their outer ends to receive a retaining pin 104.

The implement carrier is reduced in width for road transport by raising the implement supporting frame to its fully raised position, disconnecting the braces 74 and 76 from the outrigger sections by removing the pins 86, removing the stop members 94 by removal of the pins 96, moving the first pole section 78 forwardly along a second pole section 80 to reduce the length of the braces so that they are shorter than the side members 48, placing the rear ends of the first and second pole sections between the legs of the C-shaped supports 102 and locking the braces within the supports 102 by insertion of the retaining pins 104 as illustrated in FIG. 3. The braces 74 and 76 can be maintained in their reduced length position by mounting the stop members 94 near the rear ends of the first pole sections so that the stop members will abut against the rear guides 92 and prevent lengthening of the braces. Apertures 106 are provided in pole sections 78 for this purpose. The outrigger section can then be folded forwardly and their outer ends placed upon the supports 100 as illustrated in FIG. 3. The procedure for folding the outrigger sections forwardly and placing them on the transport supports 100 is fully set forth in the aforementioned U.S. Pat. No. 3,498,387. When the outrigger sections are placed upon the transport supports 100, the implement carrier is narrowed to a width which does not exceed the legal limits for public roads.

From the foregoing description of the construction and operation of the implement carrier, it can be seen that the present invention provides a simple solution to the problems encountered with previous implement carriers.

While a single preferred embodiment of the invention has been illustrated and described, various modifications will be apparent to those skilled in the art and can be made without departing from the spirit and scope of the invention.

We claim:

1. An implement carrier comprising: an implement supporting frame having a transversely extending center section and a pair of outrigger sections; means connecting the frame to a longitudinally extending draft frame for pivotal movement about a transverse axis from a lowered generally horizontal working position to a raised transport position; hinge means interconnecting the outrigger sections with the center section for vertical swinging movement of the outrigger sections relative to the center section about generally longitudinally extending axes when the implement supporting frame is in its lowered position; telescopic brace means interconnecting each of the outrigger sections with the draft frame; each brace means including first and second rigid pole sections connected to an outrigger section and the draft frame, respectively, and having adjoining ends interconnected for free telescopic relative movement; and stop means carried by one of the pole sections engageable with abutment means on the other pole section to limit the free telescopic relative movement of the pole sections and rearward movement of the corresponding outrigger section to a position in which it extends transversely of the center section.

2. The implement carrier set forth in claim 1 wherein the adjoining ends of the first and second pole sections are overlapping, the means interconnecting the adjoining ends of the first and second pole sections includes a pair of guide members slidably embracing one of the pole sections and secured to the other pole section, the guide members form the abutment means, and the stop means is mounted on the one pole section between the guide members.

3. The implement carrier set forth in claim 2 wherein each of the guide members includes a U-shaped bracket positioned over the one pole section and having the free ends of its legs secured to the other pole section.

4. The implement carrier set forth in claim 2 wherein the means interconnecting the first pole section to the outrigger section includes a first bracket secured to the outrigger frame, a second bracket secured to the first pole section for pivotal movement about a first axis, and means interconnecting the first and second brackets for relative pivotal movement about a second axis normal to the first axis, and the means interconnecting the second pole section to the draft frame includes pivot means having a generally vertically extending pivot axis.

5. The implement carrier set forth in claim 2 wherein the stop means is removably mounted on the one pole section and the first pole section is releasably interconnected with the outrigger section.

6. An implement carrier comprising: a transversely extending implement supporting frame having a center section and a pair of outrigger sections; a draft frame including a longitudinally extending draft beam securable at its forward end to a propelling vehicle, and a pair of forwardly converging members secured at their forward ends to an intermediate portion of the draft beam; means interconnecting the implement supporting frame to the rear ends of the forwardly converging members for movement about a transverse axis from a lowered generally horizontal ground-working position to a raised transport position; extensible and retractable power means connected between the implement supporting frame and the draft frame to move the implement supporting frame between its raised and lowered positions; hinge means interconnecting the outrigger sections with the center section for upward swinging movement of the outrigger sections relative to the center section when the implement supporting frame is in its lowered position and for forward movement of the outrigger sections relative to the center section when the implement supporting frame is in its raised position; wheel means secured to forward portions of and supporting the implement supporting frame; and telescopic brace means interconnecting each outrigger section and the draft frame; each brace means including first and second rigid pole sections having adjoining ends interconnected for free telescopic movement, means pivotally connecting the first and second pole sections to the outrigger section and draft frame respectively, and stop means carried by one of the pole sections engageable with abutment means on the other pole section to limit the free telescopic movement of the pole sections and rearward movement of the corresponding outrigger section to a position in which it extends transversely of the center section.

7. The implement carrier set forth in claim 6 wherein outrigger section transport supports are provided on forward portions of the forwardly converging members, brace transport supports are provided on rear portions of the forwardly converging members, the means connecting the first pole sections to the outrigger sections are releasable, the adjoining ends of the first and second pole sections of each brace means are overlapping, the means interconnecting the adjoining ends of each of the first and second pole sections of each brace means includes a pair of guide members slidably embracing one of the pole sections and secured to the other pole section, the guide members form the abutment means, and the stop means is removably mounted on the one pole section between the guide members, whereby, when the implement supporting frame is in its raised position, the outrigger sections can be folded to a road transport position by releasing the means connecting the first pole sections to the outrigger sections, removing the stop means, telescoping the first and second pole sections together and placing them on the brace transport supports, and folding the outrigger sections forwardly and placing them on the outrigger section transport supports.

* * * * *